United States Patent [19]
Dodley et al.

[11] Patent Number: 5,966,229
[45] Date of Patent: Oct. 12, 1999

[54] FREE-SPACE OPTICAL COMMUNICATIONS SYSTEM WITH OPEN LOOP TRANSMITTER CONTROL

[75] Inventors: Jeevan Prakash Dodley, Parsippany; Christopher L. Rutledge, Somerset, both of N.J.

[73] Assignee: AT&T Corp., New York, N.Y.

[21] Appl. No.: 08/877,667

[22] Filed: Jun. 18, 1997

[51] Int. Cl.$^6$ ............................ H04B 10/04; H04B 10/00
[52] U.S. Cl. ...................... 359/187; 359/172; 340/825.72
[58] Field of Search ..................................... 359/124, 157, 359/161, 172, 187; 340/825.72

[56] References Cited

U.S. PATENT DOCUMENTS 5,696,859  12/1997  Onaka et al. ............................ 359/187
5,777,773   7/1998  Epworth et al. ......................... 359/187

*Primary Examiner*—Kinfe-Michael Negash

[57] ABSTRACT

An optical transmitter is provided for use in a free-space optical communications system. The transmitter has a laser source with a tunable wavelength and adjustable power. A beam splitter divides the output beam from the laser source. A first portion of the divided beam is transmitted to a remote receiver through the atmosphere. A second portion of the divided beam is passed through a local optical path to a local receiver. The local optical path may be either a portion of the atmosphere local to the transmitter or may be an atmospheric spectral attenuation simulator. Processing circuitry receives signals from the local receiver that indicate the amount of attenuation of the second portion of the beam in the local optical path. The processing circuitry may adjust the wavelength and power output of the laser source to optimize transmission of the first portion of the beam to the receiver based on the amount of the attenuation measured in the local optical path. The processing circuitry may also adjust the wavelength and power of the laser source based on weather data received from a weather data source.

10 Claims, 2 Drawing Sheets

FREE-SPACE OPTICAL COMMUNICATIONS SYSTEM WITH OPEN LOOP TRANSMITTER CONTROL

FIELD OF THE INVENTION

This invention relates to optical communications systems, and more particularly, to controlling free-space optical transmitters in such communications systems.

BACKGROUND OF THE INVENTION

Free-space optical communications systems are systems in which beams of modulated light are transmitted from transmitters to receivers through free space (air). Such systems can be used to provide telecommunications services in areas in which it is difficult or expensive to provide hard-wired network connections using twisted pair wiring, coaxial cable, or optical fiber.

Although free-space optical communications systems have many desirable features, light transmission in such systems can be adversely affected by atmospheric absorption of the transmitted light and by limited visibility due to inclement weather conditions.

It is therefore an object of the present invention to provide improved transmitter arrangements for free-space optical communications systems.

SUMMARY OF THE INVENTION

This and other objects of the invention are accomplished in accordance with the principles of the present invention by providing a transmitter for a free-space optical communications system. The transmitter uses an infrared laser source to transmit data to a remote receiver through the atmosphere. Water vapor and other infrared absorbing gases in the atmosphere attenuate the laser beam at certain wavelengths. The transmitter preferably has processing circuitry that adjusts the wavelength of the laser source to coincide with transmission peaks in the atmospheric optical absorption spectrum.

Inclement weather also affects the attenuation of the optical beam between the transmitter and receiver. The power of the laser source may be adjusted to compensate for both atmospheric absorption due to infrared absorbing gases and attenuation due to limited visibility from adverse weather.

The transmitter has a beam splitter that divides the optical beam from the laser source. A first portion of the beam carries communications data to the receiver. A second portion of the beam is passed through a local optical path to a local receiver to determine the attenuation due to the atmosphere. The local optical path may be either a portion of the local atmosphere at the transmitter or may be an atmospheric spectral attenuation simulator filled with infrared absorbing gases.

During the operation of the transmitter, the processing circuitry varies the wavelength of the source within a range about the nominal operating wavelength of the source while monitoring the optical signal at the local receiver. The processing circuitry minimizes the attenuation of the second portion of the beam through the local optical path, thereby maximizing the transmission of the first portion of the beam through the atmosphere to the remote receiver.

The processing circuitry may also control the laser source based on visibility information. For example, if it is determined that it is currently raining in the vicinity of the optical path of the transmitted beam, the processing circuitry can increase the output power of the laser source to compensate for this source of attenuation. Information on weather conditions that affect visibility may be provided to the processing circuitry from a weather data source such as a weather service or one or more weather sensors. The processing circuitry can derive visibility information from the weather data using any suitable technique.

When an atmospheric spectral attenuation simulator is used in the local optical path, the intensity of the second beam is not responsive to changes in the concentration of infrared absorbing gases in the path of the main beam. If desired, information concerning the current concentration of infrared absorbing gases may be provided from an external weather data source. The processing circuitry may then adjust the output power of the laser source based on this information. When there is a relatively greater concentration of water vapor and other absorbing gases in the atmosphere, the output power of the laser source may be increased to compensate for the anticipated increase in attenuation in the atmosphere between the transmitter and receiver. When there is less water vapor in the atmosphere, the output power of the laser source can be reduced to extend the lifetime of the laser.

The control configuration of the transmitter is open loop with respect to the remote receiver, because the processing circuitry varies the wavelength and power of the laser source based primarily on locally derived information without cooperation from the remote receiver.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
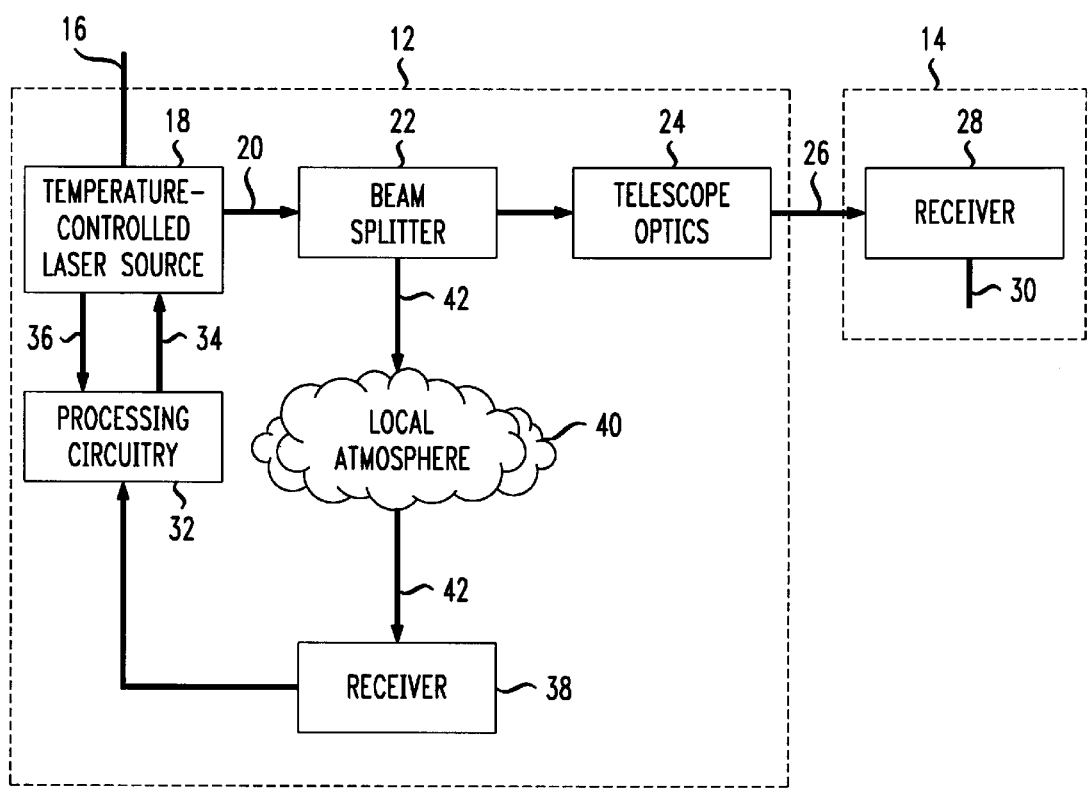
FIGS. 1 and 2 are schematic diagrams of systems in accordance with the present invention.

A portion of an illustrative free-space optical communications system 10 is shown in FIG. 1. Free-space communications systems may have multiple nodes for transmitting and receiving data. In the portion of the illustrative system 10 shown in FIG. 1, data is transmitted between transmitter node 12 and receiver node 14, but it will be appreciated that similar transmissions may also occur between other system nodes (not shown).

Data for various services, such as plain old telephone service (POTS), video service, integrated digital services network (ISDN) service, satellite-originated television service, etc., is provided at data input 16 of temperature-controlled laser source 18. The information provided to data input 16 may be provided from a free-space receiver (not shown) connected to source 18 or from a connection to the existing (non-free-space) telecommunications network infrastructure (not shown).

Laser source 18 may be a distributed feedback (DFB) laser, Fabry-Perot cavity laser, or any other suitable laser source (visible or infrared). During data transmission, the laser diode in laser source 18 may be modulated directly or may be modulated using a separate external modulator arrangement. Because atmospheric absorption can degrade the strength of the optical signal received at receiver node 14, laser source 18 preferably operates in a wavelength region where atmospheric absorption effects are minimized. There are a number of such suitable high-transmission regions in the visible and infrared regions. An illustrative suitable wavelength range is 790–810 nm. The most readily available laser sources operate in the 800 nm and 1550 nm infrared wavelength regions.

Laser source 18 preferably includes beam collimating optics (not shown). Collimated light beam 20 passes through beam splitter 22 and is coupled into telescope 24, which further conditions the beam. Upon exiting telescope 24, beam 26 passes through the atmosphere until reaching receiver 28. The path between transmitter node 12 and receiver node 28 is typically in the range of about one hundred meters to ten kilometers in length. At the entrance to receiver 28, beam 26 typically has a diameter of several inches. Telescope and focusing optics (not shown) in receiver 28 direct beam 26 onto a photodetector (not shown). Processed data from the photodetector is provided at output 30.

Beam 26 is attenuated as it passes from telescope optics 24 to receiver 28 because the atmosphere contains gases that absorb light. The absorption spectra of the atmosphere in the wavelength ranges of laser sources 18 is primarily related to water vapor absorption. Other sources of light absorption include gases such as oxygen, ozone, and carbon dioxide. Beam 26 is also attenuated by inclement weather, such as rain, fog, sleet, snow, hail, etc.

To maintain a stable and reliable optical communications link between transmitter node 12 and receiver node 14, the intensity of beam 26 that reaches receiver 28 must be controlled. The two main parameters of laser source 18 that may be adjusted to control the intensity of beam 26 at the entrance to receiver 28 are wavelength and output power. When the output power of laser source 18 is varied, the intensity of the optical signal received at receiver 28 varies by a corresponding amount. When the wavelength of the output beam is varied, the intensity of the optical signal received at receiver 28 varies due to the wavelength-dependent optical absorption characteristics of the atmosphere. The wavelength of laser source 18 is preferably adjusted to minimize atmospheric absorption. In addition, the power of laser source 18 may be reduced during operation to the minimum acceptable power level for maintaining communications.

Laser source 18 contains a laser diode and a temperature controlling element. The output power of laser source 18 can be controlled by adjusting the magnitude of the current that drives the laser diode. The wavelength of laser source 18 can be controlled by adjusting the temperature of the laser diode using the temperature controlling element. The drive current for laser source 18 and the temperature of the temperature controlling element may be controlled by control signals provided by processing circuitry 32 via communications path 34.

If desired, the output power of laser source 18 can be monitored using an optical detector coupled to the back facet of the laser diode in laser source 18. Signals from such an optical power monitoring device can be provided to processing circuitry 32 via communications path 36. Monitoring the power of laser source 18 can be helpful when tuning the wavelength of laser source 18, because changing the temperature of the laser diode may cause the output power of the diode to change slightly if the laser diode current is not adjusted to compensate for such effects.

In an arrangement using closed loop control principles, the wavelength and power of laser source 18 could be adjusted based on information returned to transmitter node 12 from receiver node 14. For example, receiver node 14 might transmit information to transmitter node 12 concerning the intensity of beam 26 when beam 26 reaches remote receiver 28. However, such a closed loop arrangement depends upon the cooperation of receiver node 14 and may be difficult to implement in practice.

If desired, an optical amplifier may be provided following laser source 18 to boost the output power of transmitter node 12.

In accordance with the present invention, beam splitter 22 directs a fraction (e.g., 1%) of beam 20 to local receiver 38 through local atmosphere 40. Local atmosphere 40, which has a path length of approximately 10–50 cm, is preferably long enough that the attenuation of beam 42 due to atmospheric absorption and the effects of reduced visibility from weather conditions may be accurately measured. The output of local receiver 38 is received and processed by processing circuitry 32.

Because local atmosphere 40 is in relatively close physical proximity to the free-space optical path of beam 26 between telescope optics 24 and receiver 28, the light absorption and visibility-limiting effects encountered by beam 42 are indicative of the absorption and visibility-limiting effects that affect the transmitted intensity of beam 26. Accordingly, processing circuitry 32 can use the locally generated optical measurements of local receiver 38 to optimize the wavelength and power settings of laser source 18. This is an open loop control configuration with respect to remote receiver 28, because the operation of transmitter node 12 is controlled without cooperation from receiver 28.

During operation of system 10, processing circuitry 32 adjusts the wavelength of laser source 18 to locate a minimum absorption level in the atmospheric absorption spectra and thereby maximize the intensity of beam 42 that reaches receiver 38. If desired, the output power of laser source 18 that is monitored with a back facet detector can be provided to processing circuitry 32, so that processing circuitry 32 can account for temperature-induced variations in the output power of laser source 18. Processing circuitry 32 may also minimize the output power of laser source 18 by decreasing its drive current as much as feasible during operation while maintaining adequate power for the communications link between transmitter node 12 and receiver node 14. Minimizing the output power of laser source 18 increases the operating lifetime of laser source 18 and increases the safety of system 10.

Figure 2:
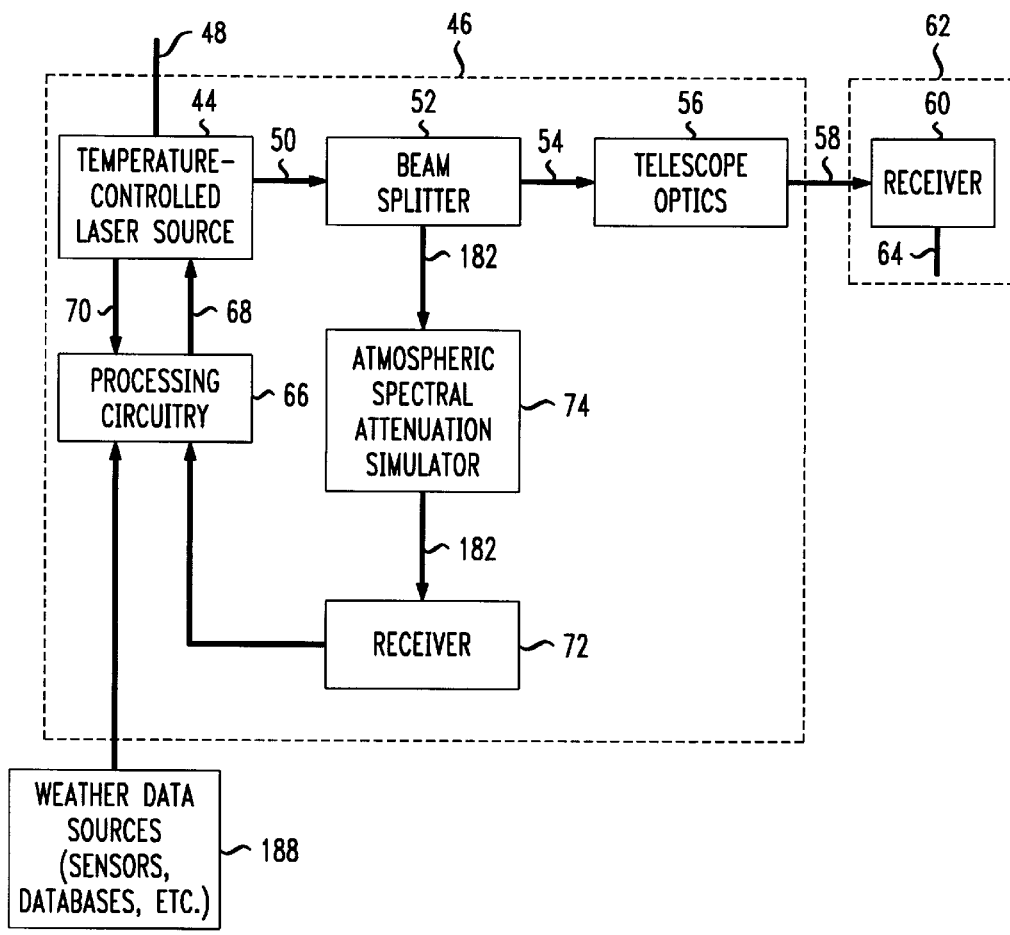

Another illustrative embodiment of the present invention is shown in FIG. 2. In system 42, data is provided to temperature-controlled laser source 44 of transmitter node 46 at input 48. Beam 50 is divided by beam splitter 52. Beam 54 is passed to collimating telescope optics 56. Beam 58 exits telescope optics 56 and passes to remote receiver 60 of receiver node 62 through the atmosphere. The path of beam 58 through atmosphere is typically the range of 100 m to 10 km in length. Data received by remote receiver 60 is provided at output 64.

Processing circuitry 66 controls the wavelength and power of laser source 44 via communications path 68. Laser power may be monitored by a back facet detector in source 44. Such laser power measurements are provided to processing circuitry 66 via communications path 70.

Beam splitter 52 directs a fraction (e.g., 1%) of the intensity of beam 50 to local receiver 72 through atmospheric spectral attenuation simulator 74. Atmospheric spectral attenuation simulator 74 is preferably a chamber containing atmospheric gases that simulate the absorption spectrum of the light-absorbing atmospheric gases present in the free-space optical path of beam 58. This allows the wavelength of laser source 44 to be tuned to a transmission peak in the absorption spectrum measured through atmospheric spectral attenuation simulator 74, thereby maximizing power transmission of beam 58 from transmitter node 46 to receiver node 62.

However, the attenuation of beam 182 through atmospheric spectral attenuation simulator 74 generally does not account for visibility-limiting weather conditions. The attenuation of optical beam 58 due to reduced visibility may be modeled using Equation 1 (particularly for path lengths less than approximately 6 km).

$$A = -16.98 \frac{L}{V} \left( \frac{\lambda}{0.55} \right)^{-0.686 V^{1/3}} \quad (1)$$

A is the amount of atmospheric attenuation due to visibility effects. L is the path length in miles. V is the visibility in miles (defined as the distance at which the human eye can discern a one meter square black target against a white background). In contrast to attenuation due to the infrared absorption spectrum of air, attenuation due to reduced visibility is weakly dependent on wavelength. Accordingly, the nominal wavelength of laser source 44 may be used as the value for $\lambda$ in Equation 1.

Equation 1 may be used to model visibility effects due to inclement weather, such as snow, rain, sleet, fog, etc. If it is known that the current visibility along the path of beam 58 is low (e.g., due to rain), then processing circuitry 66 can increase the output power of laser source 44 to compensate for this type of attenuation. If it is known that the visibility along the path of beam 58 is high (e.g., because the weather is clear), then processing circuitry 66 can reduce the operating power of laser source 44 to increase the lifetime of source 44 and improve safety.

Processing circuitry 66 may calculate the amount of attenuation due to visibility effects using Equation 1 based on the known nominal wavelength of laser source 44 or from the calculated wavelength based on the known controlled temperature of laser source 44, based on the known path length of beam 58, and based on visibility information derived from weather data provided by weather data sources 188. Weather data sources 188 may provide data from weather services, local radar information, forecasts, and statistical and historical weather information. If desired, weather data sources 188 may provide information from weather sensors. Suitable weather sensors include barometric pressure sensors, humidity sensors, dew point sensors, temperature sensors, snow sensors, rainfall sensors, etc. Sensors are preferably located near to transmitter node 46 and receiver node 62. If desired, sensors may be located at one or more local weather stations. Stand-alone weather sensors may also be provided. Such stand-alone weather sensors are preferably located along the path of beam 58. Stand-alone sensors may relay weather data to processing circuitry 66 using any suitable communications path, such as wireless links or network connections.

Visibility information may be derived from data from weather data sources 188 using any suitable technique. For example, statistics may be used to establish a relationship between a measured rainfall amount and a corresponding visibility. Look-up tables or other data structures containing such statistical relationships may be stored in processing circuitry 66, so that processing circuitry 66 can derive visibility information based on data from weather data sources 188 in real time.

The shape of the infrared atmospheric absorption spectrum does not vary significantly as a function of the partial pressure of water vapor or other infrared absorbing gases in the atmosphere. Accordingly, at a given wavelength, processing circuitry 66 can calculate the expected attenuation of beam 58 due to atmospheric absorption, provided that processing circuitry 66 has access to information representative of the current partial pressure of water vapor (and other infrared absorbing gases) in the atmosphere.

If processing circuitry 66 is provided with information that indicates that the amount of water vapor in the atmosphere is currently higher than the water vapor concentration in atmospheric spectral attenuation simulator 74, processing circuitry 66 can scale up its calculation of the attenuation of beam 182 a corresponding amount. Similarly, if processing circuitry 66 is provided with information that indicates that the amount of water vapor in the atmosphere is currently lower than the water vapor concentration in atmospheric spectral attenuation simulator 74, processing circuitry 66 can scale down its calculation of the attenuation of beam 182. (Processing circuitry 66 also takes into account that the known path length of beam 58 is significantly longer than the path length of beam 182.) Once the expected attenuation of beam 58 has been determined, processing circuitry 66 can increase or decrease the output power of laser source 44 to ensure adequate optical power is used for the communications link between transmitter node 46 and receiver node 62 without over-powering laser source 44.

Processing circuitry 66 may obtain information concerning the concentration of infrared absorbing gases currently in the atmosphere from weather data sources 188. Absorbing gas concentration information may be derived from humidity data, dew point data, temperature data, barometric data, etc., using any suitable technique.

Figure 3:
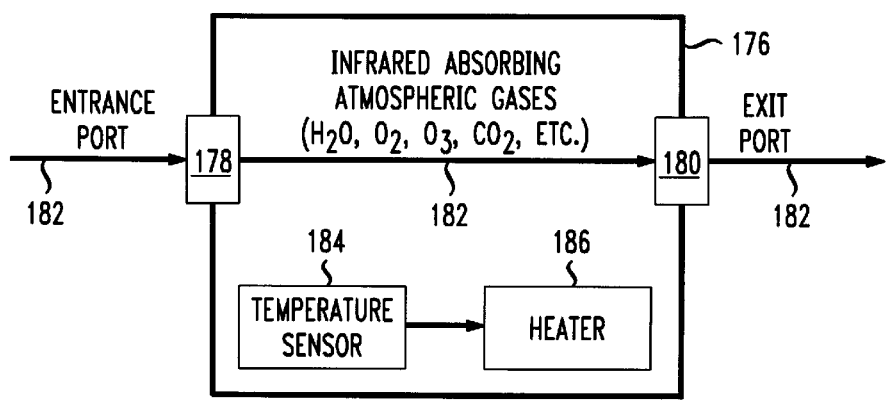
FIG. 3 is a partly schematic diagram of an atmospheric spectral attenuation simulator in accordance with the present invention.

An illustrative embodiment of an atmospheric spectral attenuation simulator 74 is shown in FIG. 3 (labeled as atmospheric spectral attenuation simulator 174). Simulator 174 has a chamber 176 that has optical ports 178 and 180. Beam 182 passes through ports 178 and 180 and through the interior of chamber 176. Chamber 176 is preferably evacuated and backfilled with suitable infrared absorbing atmospheric gases to simulate the spectral structure of the optical absorption spectrum of the atmosphere in the vicinity of beam 58. Most optical absorption is due to water vapor ($H_2O_{(g)}$), so water vapor is preferably used to fill chamber 176. Chamber 176 may also be filled with suitable quantities of additional infrared absorbing gases such as oxygen ($O_2$), ozone ($O_3$), and carbon dioxide ($CO_2$). Chamber 176 is preferably sealed semi-permanently, but may be pumped out and backfilled with various gas mixtures in real time under the control of processing circuitry 66 if desired to provide additional simulation capabilities. An neutral density filter controlled by processing circuitry 66 may also be added to atmospheric spectral attenuation simulator 74 if desired.

Simulator 174 preferably has temperature sensor 184 and heater 186, which are used to maintain the interior temperature of chamber 176 sufficiently warm to prevent condensation of water vapor in the interior of chamber 176 (particularly on the interior surfaces of ports 178 and 180). If desired, temperature sensor 184 and heater 186 may operate at a predetermined set point. Alternatively, the temperature maintained by heater 186 may be controlled by processing circuitry 66 (FIG. 2). Chamber 176 is preferably long enough that beam 182 is measurably attenuated due to absorption by the infrared absorbing atmospheric gases.

The foregoing is merely illustrative of the principles of this invention and various modifications can be made by those skilled in the art without departing from the scope and spirit of the invention.

What is claimed is:

1. An optical transmitter apparatus for use in transmitting optical signals to a remote receiver through the atmosphere, comprising:

a laser source for data transmission having an optical output beam whose wavelength may be controlled;

a beam splitting device for dividing the optical output beam from the laser source into a first beam that is transmitted to the remote receiver through the atmosphere and a second beam;

a local optical path through which the second beam passes the local optical path having attenuation characteristics representative of the atmospheric attenuation of the first beam;

a local receiver for measuring the intensity of the second beam after the second beam has passed through the local optical path; and processing circuitry for adjusting the wavelength of the laser source based on the measured intensity of the second optical beam, so that atmospheric attenuation of the first optical beam is minimized.

2. The apparatus defined in claim 1 further comprising means for adjusting the power of the optical output beam based on the measured intensity of the second optical beam, so that the lifetime of the laser source is maximized.

3. The apparatus defined in claim 2, wherein weather data is provided by a weather data source, the means for adjusting the power further comprising means for adjusting the power based on the weather data.

4. The apparatus defined in claim 1 wherein the local optical path is a local portion of the atmosphere, the apparatus further comprising means for adjusting the wavelength of the laser source based on the measured intensity of the second optical beam as the second optical beam exits the local portion of the atmosphere.

5. An optical transmitter apparatus for use in transmitting optical signals to a remote receiver through the atmosphere, comprising:

a laser source for data transmission having an optical output beam whose wavelength may be controlled;

a beam splitting device for dividing the optical output beam from the laser source into a first beam that is transmitted to the remote receiver through the atmosphere and a second beam;

an atmospheric spectral attenuation simulator having attenuation characteristics representative of the atmospheric attenuation of the first beam, the second beam being passed through the atmospheric spectral attenuation simulator;

a local receiver for measuring the intensity of the second beam after the second beam has passed through the atmospheric spectral attenuation simulator; and processing circuitry for adjusting the wavelength of the laser source based on the measured intensity of the second optical beam as the second optical beam exits the atmospheric spectral attenuation simulator, so that atmospheric attenuation of the first optical beam is minimized.

6. The apparatus defined in claim 5 wherein the atmospheric spectral attenuation simulator comprises a heater for preventing condensation of water vapor inside the atmospheric spectral attenuation simulator.

7. An optical transmitter apparatus for use in transmitting optical signals to a remote receiver through the atmosphere, comprising:

a laser source for data transmission having an optical output beam whose wavelength may be controlled;

a beam splitting device for dividing the optical output beam from the laser source into a first beam that is transmitted to the remote receiver through the atmosphere and a second beam that is passed through a local optical path having attenuation characteristics representative of the atmospheric attenuation of the first beam;

a local receiver for measuring the intensity of the second beam after the second beam has passed through the local optical path; and processing circuitry for adjusting the wavelength of the laser source based on the measured intensity of the second optical beam, so that atmospheric attenuation of the first optical beam is minimized, the processing circuitry including means for receiving weather data from a weather data source.

8. The apparatus defined in claim 7 wherein the weather data source further comprises a plurality of weather sensors.

9. An optical transmitter apparatus for use in transmitting optical signals to a remote receiver through the atmosphere, comprising:

a laser source for data transmission having an optical output beam whose wavelength may be controlled;

a beam splitting device for dividing the optical output beam from the laser source into a first beam that is transmitted to the remote receiver through the atmosphere and a second beam that is passed through a local optical path having attenuation characteristics representative of the atmospheric attenuation of the first beam;

a local receiver for measuring the intensity of the second beam after the second beam has passed through the local optical path; and processing circuitry for adjusting the wavelength of the laser source based on the measured intensity of the second optical beam, so that atmospheric attenuation of the first optical beam is minimized, the processing circuitry including means for calculating the expected attenuation of the first optical beam using visibility information.

10. The apparatus defined in claim 9 wherein a weather data source provides weather data, the processing circuitry further comprising means for deriving the visibility information from the weather data.

* * * * *